United States Patent
Pidutti et al.

(10) Patent No.: US 6,538,346 B2
(45) Date of Patent: *Mar. 25, 2003

(54) SYSTEM FOR DRIVING A REACTIVE LOAD

(75) Inventors: Albino Pidutti, Udine (IT); Mario Scurati, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 140 days.

This patent is subject to a terminal disclaimer.

(21) Appl. No.: 09/740,726

(22) Filed: Dec. 18, 2000

(65) Prior Publication Data

US 2001/0026100 A1 Oct. 4, 2001

Related U.S. Application Data

(63) Continuation-in-part of application No. 09/200,297, filed on Nov. 25, 1998, now Pat. No. 6,181,031.

(51) Int. Cl.⁷ ................................................. H01B 1/24
(52) U.S. Cl. .................... 307/127; 307/43; 307/115; 307/125
(58) Field of Search ........................ 307/127, 115, 307/43, 125; 323/207, 209; 363/15, 34; 361/155, 156, 159

(56) References Cited

U.S. PATENT DOCUMENTS

| 4,691,270 A | 9/1987 | Pruitt ........................... 363/56 |
| 5,260,606 A | 11/1993 | Young ........................ 307/139 |
| 5,264,736 A | 11/1993 | Jacobson ..................... 307/246 |
| 5,493,183 A | 2/1996 | Kimball ....................... 315/308 |
| 5,541,829 A | 7/1996 | Maehara et al. .............. 363/34 |
| 5,559,478 A | 9/1996 | Athas et al. ........... 331/117 FE |
| 5,747,947 A | 5/1998 | Hak ............................ 315/308 |
| 5,764,496 A | 6/1998 | Sato et al. ..................... 363/37 |
| 6,181,031 B1 * | 1/2001 | Pidutti et al. ................ 307/127 |

FOREIGN PATENT DOCUMENTS

| EP | 0 667 733 A1 | 8/1995 |
| EP | 0 730 392 A2 | 9/1996 |
| EP | 0 809 421 A2 | 11/1997 |
| GB | 2 196 805 A | 5/1988 |
| JP | 2-67006 | 3/1990 |
| JP | 10-174436 | 6/1998 |
| WO | WO 86/05304 | 9/1986 |

* cited by examiner

Primary Examiner—Stephen W. Jackson
Assistant Examiner—Robert L DeBeradinis
(74) Attorney, Agent, or Firm—Lisa K. Jorgenson; Robert Iannucci; Seed IP Law Group PLLC (57) ABSTRACT

A circuit to control the supply of a reactive load, for supplying variable quantities of energy to the load in a predetermined manner is included in a system. The system also includes reactive components which are connected to the load by way of a controllable electronic switch and which form a resonant circuit with the load when the electronic switch is closed. Further, the system includes a circuit for activating the electronic switch, and a control unit which coordinates the operation of the controlled supply circuit and of the activation circuit in accordance with a predetermined program. The system enables the load to be driven with a particularly low power dissipated.

25 Claims, 7 Drawing Sheets

SYSTEM FOR DRIVING A REACTIVE LOAD

CROSS REFERENCE TO RELATED APPLICATION

This application is a continuation-in part of U.S. patent application Ser. No. 09/200,297, filed on Nov. 25, 1998, which is now U.S. Pat. No. 6,181,031 B1.

TECHNICAL FIELD

The present invention relates to a system for driving a reactive load.

BACKGROUND OF THE INVENTION

For simplicity of description, reference will be made below to applications in which the reactive load is capacitive but it is intended that the invention may, in practice, also be implemented in just the same manner in applications in which the reactive load is inductive, bearing in mind the equivalence of the voltage and current behavior of capacitances and inductances.

In order to supply energy to a load in a controlled manner, be it a capacitive, an inductive, or a resistive load, it is well known to use an amplifier supplied by a direct-current voltage supply and controlled so as to modulate the supply of a variable quantity of energy to the load in predetermined manner, that is, so as to achieve a given current or voltage waveform in the load.

Figure 1:
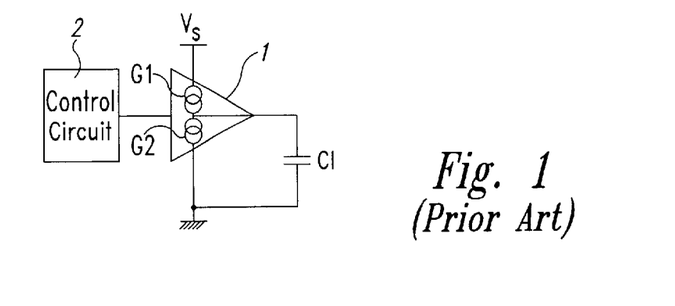
FIG. 1 shows schematically a known system for driving a capacitive load.

An application of this type with a capacitive load is shown in FIG. 1 of the appended drawings. An amplifier 1 has an output stage represented schematically by two controllable current sources G1, G2, connected in series between the rails of a voltage supply, indicated Vs and by the earth symbol. The output terminal of the amplifier, which is the connection node between the two current sources is connected to a capacitive load represented by a capacitor Cl. A control circuit 2 supplies control signals to the amplifier so as to modulate the supply or absorption of current by the current sources G1 and G2, and hence the supply to the load Cl, in accordance with a predetermined program.

Figure 2:
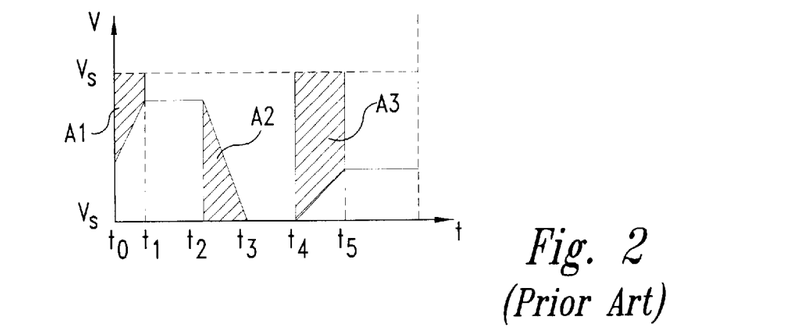
FIGS. 2, 3 and 4 are graphs showing the voltage, the current, and the power dissipated in the system of FIG. 1 as functions of time, respectively.

It is assumed that current is supplied to the load Cl so as to achieve therein a voltage waveform as shown in FIG. 2, that is, that the capacitor Cl is to be charged from 0 to a voltage V1, starting from a time t0, in a period t0–t1, the charge in the capacitor Cl is constant in a period t1–t2, and that it is to be discharged in a period t2–t3. After a delay period t3–t4, the capacitor Cl is again charged in period t4–t5. The control circuit 2 will therefore activate the current source G1 from the time t0 to the time t1 with the current source G2 deactivated, deactivate the current source G1 in period t1–t2, activate the current source G2 in period t2–t3 with the current source G1 deactivated, deactivate the current source G2 in period t3–t4, and reactivate the current source G1 in period t4–t5.

Figure 3:
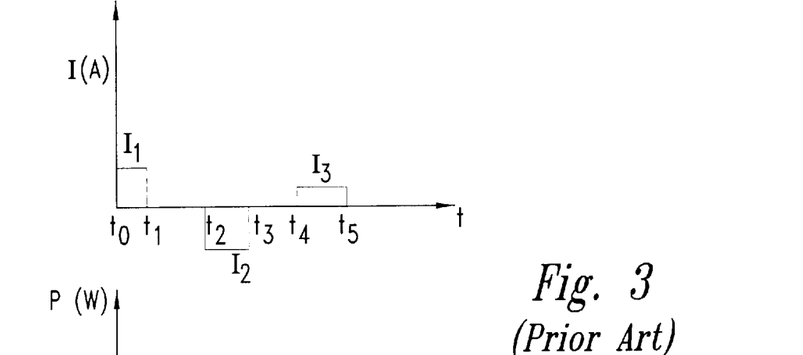
Figure 4:
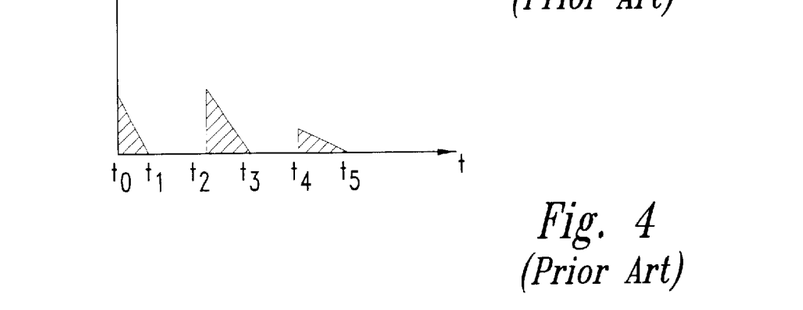

A graph of the current I in the load Cl as a function of time is shown in FIG. 3 and a graph of the power Pd dissipated in the current sources G1 and G2 as functions of time is shown in FIG. 4. It can easily be shown that, in a practical embodiment, if Cl=2 $\mu$F, t0–t1=6 $\mu$s, t1–t2=4 $\mu$s, V1=35V and Vs=40V, there is a constant charge current I1=11.6 A, a constant discharge current I2=17.5 A, an instantaneous maximum power P1=464 W dissipated in the current source G1, an instantaneous maximum power P2=612.5 W dissipated in the current source G2, a mean power in the period t0–t1 of 156.6 W, a mean power in the period t2–t3 of 122.5 W, and a total power dissipated in the period t0–t3 of 272.1 W. The areas A1, A2, and A3 represent the power dissipated by the error amplifier 1.

SUMMARY OF THE INVENTION

In many applications, the power dissipation of the system described above is considered excessive. A need has therefore arisen for alternative systems for driving a reactive load with lower power dissipation.

According to an embodiment of the present invention a system for driving a reactive load is presented. The system includes means for controlling a load by supplying variable quantities of energies to the load in a predetermined manner as well as a reactive component coupled to the load through an electronic switch that forms a resonant circuit with the load when the switch is closed. The system also includes means for activating the switch and a control unit coupled to both the supply means and the activation means to coordinate their operation to supply energy to the load in a predetermined manner.

BRIEF DESCRIPTION OF THE DRAWINGS

The invention will be understood better from the following detailed description of some embodiments thereof given by way of non-limiting example, with reference to the appended drawings.

DETAILED DESCRIPTION OF THE INVENTION

Figure 5:
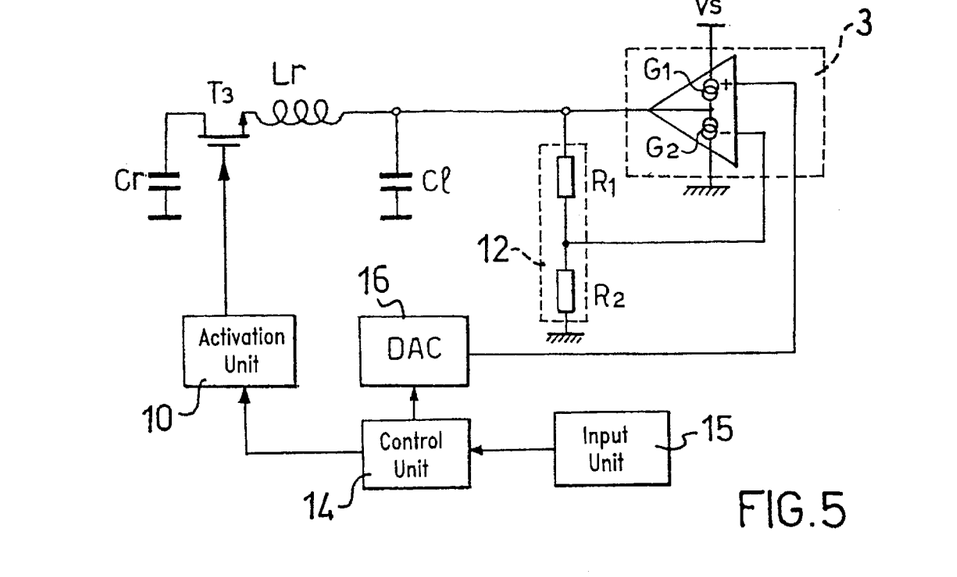
FIG. 5 is a diagram, partially in block form, of a system for driving a capacitive load according to the invention.

In the circuit diagram of FIG. 5, a capacitive load, for example, a piezoelectric printing head of an ink-jet printer or an element of an electroluminescent panel, again indicated Cl, is connected to the output of an operational amplifier 3 having an output stage represented by two controllable current sources G1 and G2 connected in series with one another between the terminals Vs and earth of a direct-current voltage supply, as in the system of FIG. 1. In this case, however, in parallel with the load Cl, there is a circuit constituted by an inductance Lr, an electronic switch T3, for example, a transistor, and a capacitor Cr, connected in series. When the electronic switch T3 is closed, the components Lr and Cr, together with the load Cl, constitute a resonant circuit.

An activation unit 10 is connected to the control terminal of the electronic switch T3 in order to open it or close it at predetermined time intervals, as will be explained further below.

The operational amplifier 3 has an inverting input connected to a sensor 12 for detecting an electrical quantity in the load and a non-inverting input connected to a digital-analog convertor or DAC 16. In this embodiment, the sensor is a resistive divider connected in parallel with the load Cl and formed by two resistors R1 and R2 but could be any type of sensor suitable for the task. The intermediate tap of the divider is connected to the inverting input of the amplifier 3 in order to supply a voltage thereto, as the electrical quantity indicative of the operation of the resonant circuit. In this embodiment, the DAC 16 also supplies to the amplifier 3 a voltage, more precisely, a voltage which varies as the waveform to be produced in the load Cl. The operational amplifier operates as a comparator of the voltages applied to its inputs and, together with the sensor 12, constitutes a system with error-compensation feedback. The waveform is stored in digital form in a control unit 14 which has the function of coordinating the operation of the system in accordance with a predetermined program. The control unit is similar to that of control circuit 2, with some of the differences explained in detail below. In particular, it is connected to the activation unit 10 in order to provide it with the control signals for the switch T3 at predetermined times correlated with the waveform stored, for example, as a result of the recognition, in the control unit 14, of a sample of the waveform stored which defines a reference moment.

In this embodiment, the control unit 14 is provides for storing the waveform and the operating program of the system. The stored information can be modified according to requirements by means of an input unit 15. This is accomplished by control unit 14 encompassing, for instance, a memory such as a ROM or EPROM to store data representing a waveform. The control unit 14 also contains control circuits to access the memory, such as input and output control circuits. The input unit 15 is a logic circuit adapted to initialize the control unit 14, and can be embodied in a number of forms, such as a micro-controller, memory programming unit, data input device, or even a keyboard. These examples of the control unit 14 and the input unit 15 are non-exhaustive. For example, control unit 14 could also be a programmable logic device, non-volatile random access memory, or an Application Specific Integrated Circuit (ASIC). The input unit 15 will be selected in accordance with the type of control unit 14 used. In other applications, however, it may suffice for the control unit 14 to contain a non-modifiable waveform and a fixed operating program.

Figure 6:
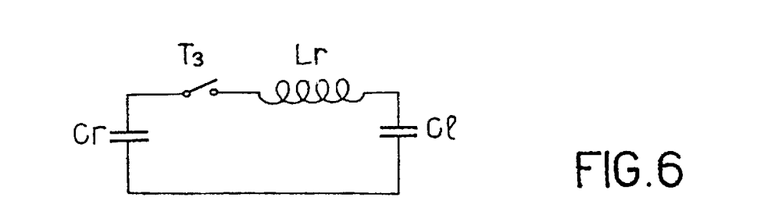
FIG. 6 is a diagram of a resonant circuit used to illustrate the operation of the system of FIG. 5.
Figure 7:
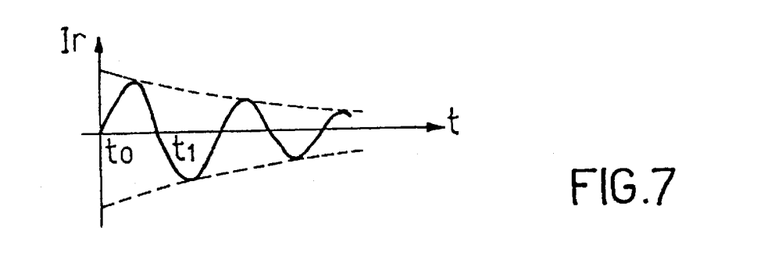
FIG. 7 is a graph of the current in the circuit of FIG. 6 as a function of time.
Figure 8:
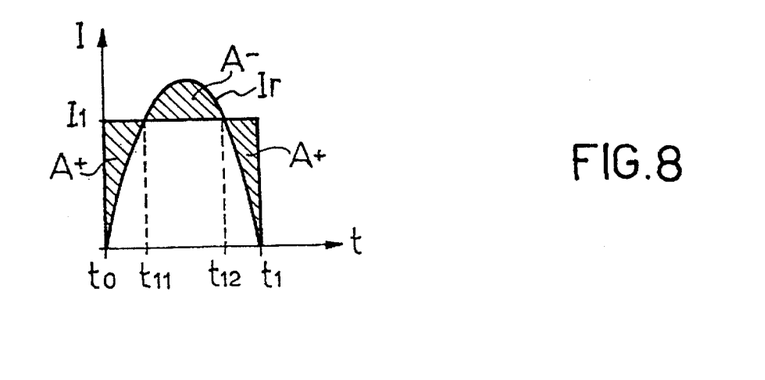
FIG. 8 shows how a portion of the graph of FIG. 7 should be modified to represent the graph of the current produced by the system of FIG. 6 according to the invention.

Reference will be made first of all to FIGS. 6, 7 and 8 to explain the operation of the circuit according to the invention, shown schematically in FIG. 5.

FIG. 6 shows a resonant circuit constituted by the same components Cr, Cl, Lr and T3 which are present in the circuit of FIG. 5. It is assumed that the capacitor Cr is charged to a predetermined voltage and that, at the time t0, the switch T3 which, up to this time has been open, is closed. A sinusoidal current Ir which mirrors the exchange of energy between the inductance Lr and the capacitance of the two capacitive components Cr and Cl flows in the resonant circuit, as shown in FIG. 7, and is damped over time because of the internal resistance of the circuit.

With reference again to the circuit of FIG. 5 according to the invention, it is assumed that, initially, Cr and Cl are discharged and the switch T3 is open. The capacitive load Cl starts to be charged by means of the current source G1 of the operational amplifier 3 until a voltage determined in the control unit 14 is reached and is applied in analog form to the non-inverting input of the operational amplifier 3 by means of the DAC 16. The control unit 14 then closes the switch T3 by means of the activation unit 10, permitting a transfer of charge from Cl to Cr through the inductance Lr. The transfer of charge finishes when the switch T3 is re-opened at a moment determined by the activation unit 10.

According to this embodiment of the invention, the energy stored in the reactive components of the resonant circuit is used, in combination with that supplied or absorbed by the current sources G1 and G2 of the operational amplifier 3, to produce a predetermined waveform in the capacitive load Cl.

In this embodiment, in the time interval t0–t1 corresponding to one half period of the sinusoidal current Ir, the waveform is required to be a slope like that of FIG. 2 in the same period t0–t1. The first half-wave of the current of FIG. 7 is therefore "squared" in order to become identical to that of FIG. 3 between t0 and t1. This "squaring" operation can be represented geometrically with reference to FIG. 8, if the current in the capacitive load Cl is controlled by means of the operational amplifier 3 in a manner such as to "take away" the top portion of the half-wave, that is, the portion indicated A− in which Ir is greater than I1 and to "add" to the sides of the half-wave, the substantially triangular portions, indicated A+, which are lacking, in order to produce a square wave of amplitude I1.

This operation is performed by the system according to the invention shown in FIG. 5 under the control of the control unit 14. More particularly, by enabling the activation unit 10, the control unit 14 causes the switch T3 to be closed and applies a reference voltage to the non-inverting input of the operational amplifier 3 by means of the DAC 16. Upon the assumption that the capacitor Cr is already charged, a current due to the operational amplifier 3 and to the energy exchange between the reactive components of the resonant circuit flows in the capacitive load and a corresponding voltage is detected by the sensor 12. The operational amplifier 3 compares this voltage with the reference voltage supplied by the DAC 16. In the embodiment described, after the time t0 at which the switch T3 is closed, as long as the current Ir is less than the constant current I1 required to form the desired voltage slope in the capacitive load Cl, the amplifier 3 supplies the quantity of current which is lacking in order to reach the level I1, by means of the current source G1. As soon as the current in the resonant circuit tends to exceed the value I1 at the time t11, the operational amplifier 3 absorbs the quantity of current in excess of the value I1 by means of the current source G2, discharging it to earth until the time t12.

During the subsequent interval from t12 to t1, the operation of the operational amplifier 3 is similar to that in the period from t0 to t11.

At the time t1, the activation unit 10 opens the switch T3. Since the time t1 corresponds to the zero-crossing of the current Ir, the activation unit 10 advantageously performs this operation automatically by means of a zero-crossing detector, as shown in FIG. 10, which will be described below.

Figure 9A:
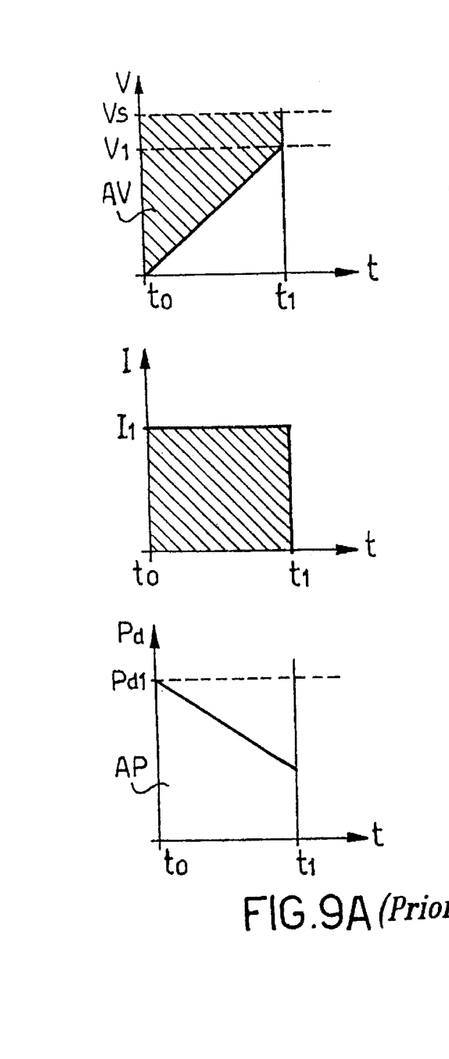
FIGS. 9A–9D are various graphs of voltage, current and power dissipated which are useful for an understanding of the operation of the system according to the invention.
Figure 9B:
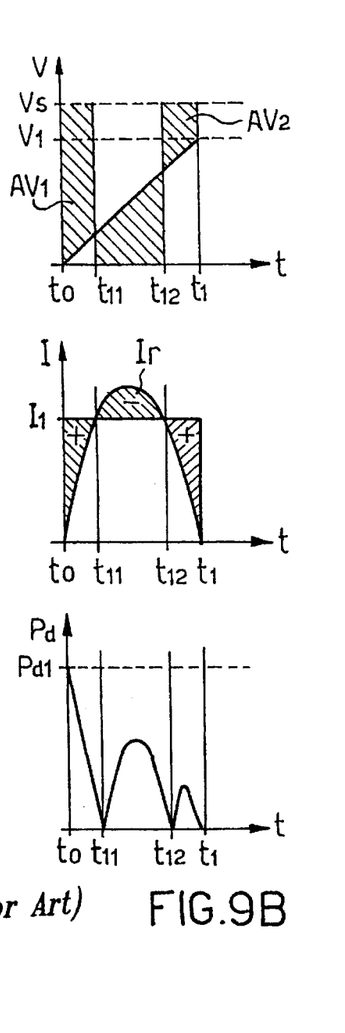

In order to evaluate the power dissipated in the driving system according to the invention shown in FIG. 5, reference is made to FIG. 9B in comparison with FIG. 9A which gives the graphs of FIGS. 2, 3 and 4, restricted to the period t0–t1. The power Pd dissipated is obtained as the integral over time of the product of the voltage and the current. In the known system, power is dissipated throughout the period in which the current source G1 of the amplifier 1 supplies current to the load Cl, that is, from t0 to t1. The amount of power dissipated decreases linearly from a maximum Pd1 when the difference between the supply voltage and the voltage in the capacitive load is at a maximum at the time t0, to a minimum value when G1 ceases to supply current. Since the current I is constant at the level I1, the area AP between the straight line which represents the power dissipated Pd and the coordinate axes is proportional to that AV defined between the straight line which represents the voltage V and the supply-voltage level Vs. In the system according to the invention, as can be seen in FIG. 9B, the power dissipated at the time t0 is equal to that dissipated at the time t0 in the known system, but decreases rapidly, since it also benefits from the contribution of the current circulating in the resonant circuit, until it reaches zero at the time t11 when the current Ir in the resonant circuit reaches the level I1 necessary to achieve the desired voltage slope in Cl. In the period between t11 and t12, it is then limited to the contribution of the excess current flowing through the current source G2 and, at the time t12, rises again but to a level lower than its maximum value at the moment t0. It then falls rapidly until it reaches zero at the time t1 at which T3 opens. As can be seen from a comparison between the graphs of the power dissipated in FIGS. 9A and 9B, the area defined by the curve of the power dissipated Pd and by the coordinate axes is much smaller in FIG. 9B than in FIG. 9A; this means that the total power dissipated in the period t0–t1 in the system according to the invention is much less than that dissipated in the known system.

Upon completion of the charging operation described above, the capacitive load can be discharged in controlled manner, possibly after a waiting period. The discharge of the capacitive load can be controlled by the control unit 14 and by the activation unit 10 by a process similar to the charging process, so as to achieve, in the load, a waveform of opposite sign which may be the same as the charging waveform or different, according to the programming of the control unit 14. The charging and discharging process, with any intervals, can then be continued in accordance with the program of the control unit 14.

Figure 10:
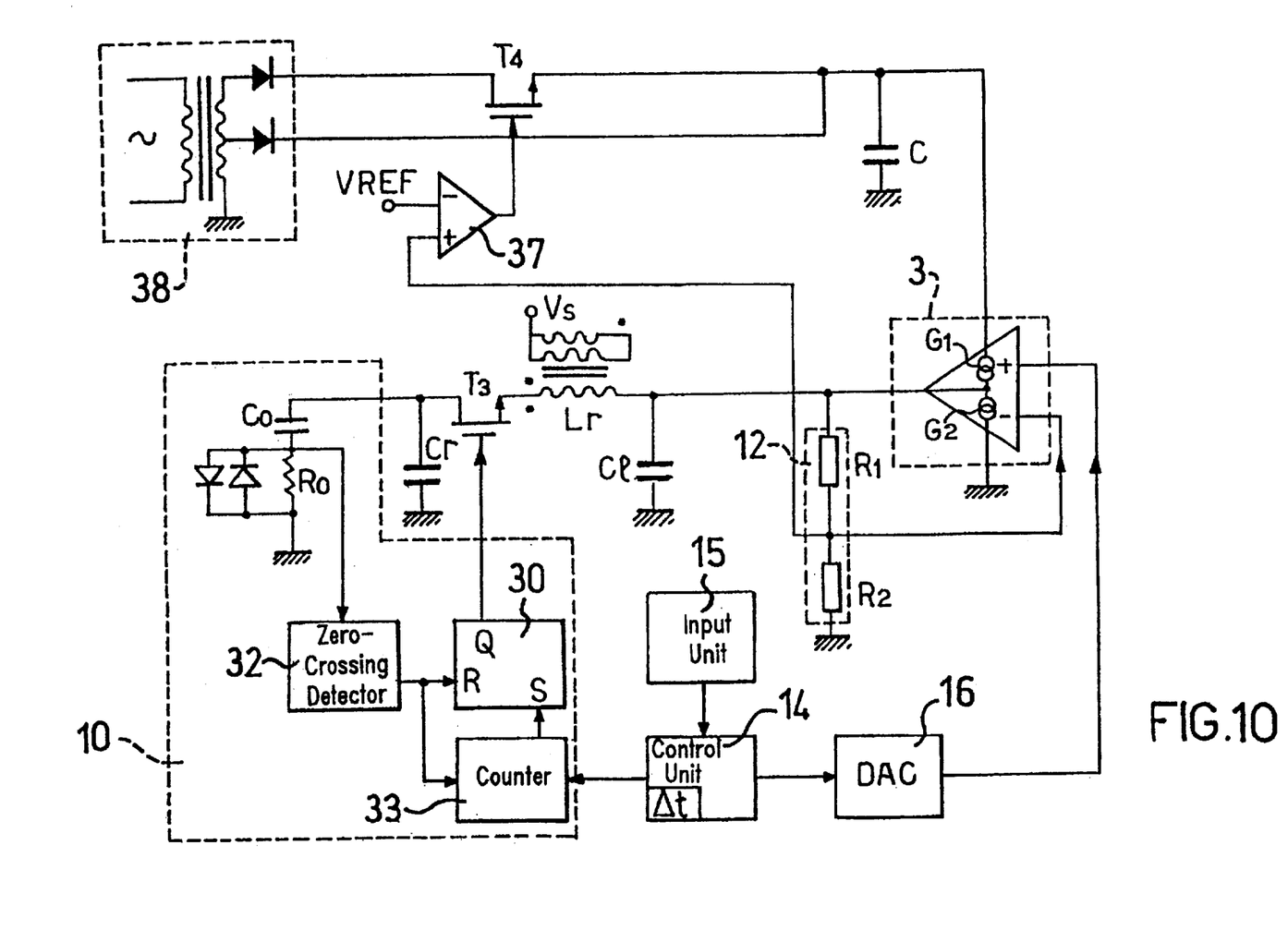
FIG. 10 shows a second embodiment of the system according to the invention, part of which is similar to that of FIG. 5, with some portions shown in greater detail.

In order further to reduce the total power dissipated, in an embodiment of the invention shown in FIG. 10, in which elements identical to those of FIG. 5 are indicated by the same reference numerals, a phase shift is created between the current Ir circulating in the resonant circuit and the charging or discharging current in the capacitive load Cl. This is achieved by delaying or advancing the closure of the switch T3 relative to a predetermined moment within the period of the waveform, according to the waveform to be reproduced in the capacitive load Cl. This phase shift is achieved by means of a suitable delay unit Δt in the control unit 14.

Figure 9C:
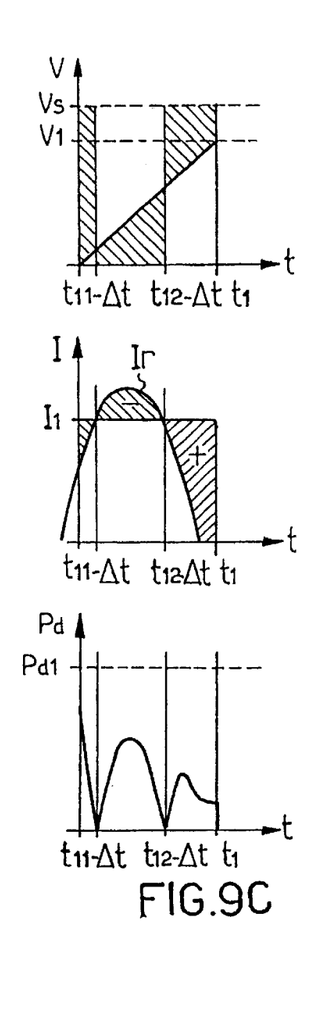

In the embodiment described with reference to FIG. 9C, the phase shift is an advance, the effect of which can be appreciated from a comparison of FIGS. 9B and 9C. As can be seen in the voltage graph of FIG. 9B, of the voltage contribution to the power dissipated Pd, expressed graphically by the area AV1, in the period in which the current source G1 supplies current before the time t11, is considerable and is greater than that, expressed by the area AV2, in the period following the time t12 in which the current source G1 supplies current again. A small advance Δt in the closure of T3, as shown in FIG. 9C, reduces the both the voltage and the current contributions in the period t0–t11 so that the net result is a reduction in the mean power dissipated.

Figure 9D:
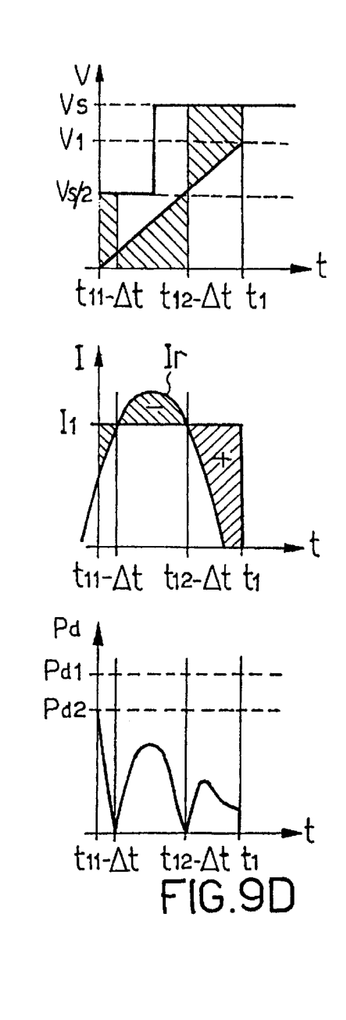

A further reduction in the mean power dissipated is achieved by reducing the supply voltage of the operational amplifier 3 during the period of time in which the voltage in the capacitive load is low, for example, by changing from a level Vs to a level Vs/2, as shown in FIG. 9D. As can be seen in the voltage graph, the contribution of the voltage to the determination of the power in the period of the initial charging of Cl is further reduced in this case. This effect is achieved by means of a suitable supply with two switchable voltage levels.

A schematic example of a supply of this type is shown in FIG. 10. A voltage supply 38 with two output levels is connected to the supply terminals of the operational amplifier 3 in parallel with a smoothing capacitor C. An electronic switch T4 is associated with the supply 38 and is controlled by the output of a comparator 37. The latter has one input connected to a reference supply VREF and the other input connected to the sensor 12. When the voltage detected by the sensor is equal to or less than VREF, the output of the comparator is at a low level, that is, such as not to activate the switch T4 and the operational amplifier 3 is supplied by the lower-level voltage. When the level of the voltage detected is greater than VREF, however, the output of the comparator 37 is at a high level such as to close the switch T4 so that the operational amplifier 3 is supplied with the higher-level voltage. Since, as can be seen in the voltage graph of FIG. 9D, the contribution of the voltage to the power dissipated is reduced in the period in which the current source G1 supplies current for the initial charging of the load Cl, the power dissipated in this period of time is also reduced.

Naturally, the two measures described above for further reducing the power dissipated may also be used individually.

FIG. 10 also shows in some detail the unit 10 for activating the switch T3. This unit 10 comprises a flip-flop 30 an input S of which receives a switching (setting) signal from a counter 33 connected to the control unit 14. The time at which this signal is emitted is determined by the control unit 14 on the basis of the wave-form programmed to be reproduced in the capacitive load and on the basis of any delay or advance Δt programmed. The setting signal at the input S of the flip-flop produces a "high" signal at the output Q of the flip-flop such as to close the switch T3. The counting cycle of the counter is selected so as to define the most suitable moment to close the switch T3 within the period of the waveform.

The activation unit 10 also comprises a current zero-crossing detector 32 comprising a capacitor Co and a resistor Ro connected in series with one another in parallel with the capacitor Cr of the resonant circuit, as well as two diodes connected so as to conduct in opposite directions in parallel with the resistor Ro, in order to limit the voltage drop therein. When the switch T3 is closed, a sinusoidal voltage which is in phase with the current passing through the inductance Lr appears in the resistor Ro.

Every zero crossing of the current passing through the resistor Ro is detected by a zero-crossing detector and indicator circuit, indicated by a block 32. The circuit 32 emits an output pulse which zeroes the counter 33 and causes the flip-flop 30 to switch to the "reset" state R, thus causing the switch T3 to open.

In FIG. 10, the inductance Lr is represented by three separate windings, of which one is in counterphase, and which are connected as shown in order to absorb and discharge the recirculating current which is created during the opening and closure of the switch T3.

In a practical embodiment of the system according to the invention for driving a piezoelectric ink-jet printing head, in which the capacitive load was equal to that of the known application described at the beginning with the same voltages and times (Cl=2 $\mu$F, t1=6 $\mu$s, V1=35V and Vs=40V) and with an inductance Lr=4.5 $\mu$H, a capacitor Cr=1.4 $\mu$F and a delay $\Delta$t=0.8 $\mu$s, a mean power dissipated of 20 W was obtained, that is, much less than that obtained with the known driving system.

Figure 11:
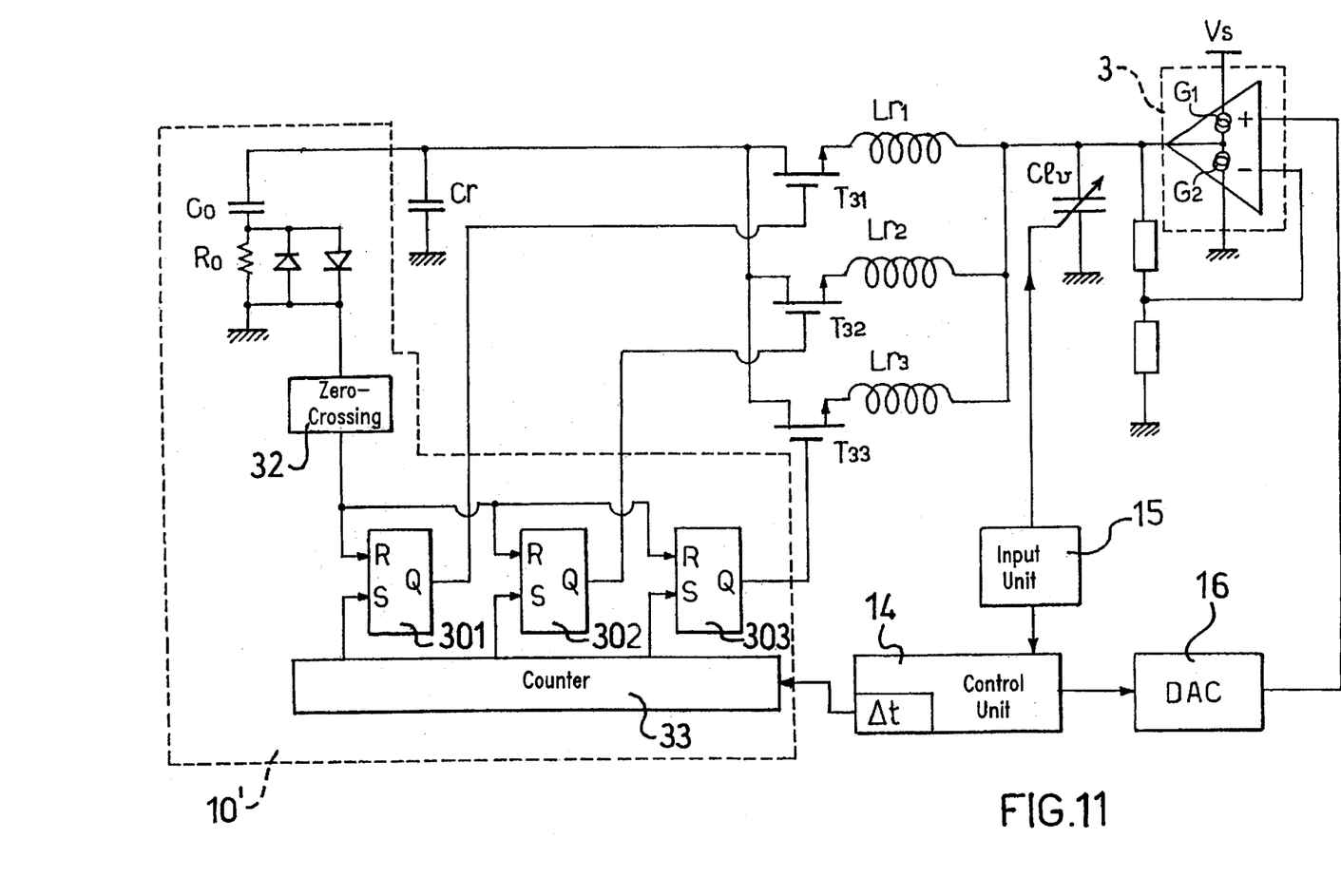
FIG. 11 shows a third embodiment of the system according to the invention.

The embodiment of the invention shown in FIG. 11, in which components identical to those of FIG. 10 are indicated by the same reference symbols or numerals, relates to an application in which the capacitive load to be driven may vary, that is, may adopt different capacitances of predetermined values. Various inductances are provided and can be connected in the circuit selectively in order to optimize the energy balance between the various reactive components of the resonant circuit in any situation; in this embodiment, three inductances are provided but, naturally, there may be a larger number, if necessary. The three inductances, indicated Lr1, Lr2 and Lr3, are connected in the resonant circuit in series with three respective electronic switches, indicated T31, T32, T33, each having its control terminal connected to the output of a respective flip-flop 301, 302 or 303 of a control unit 10' similar to the unit 10 of FIG. 10.

The capacitance value of the capacitive load at any particular time, indicated Clv in this example, is determined by the input unit 15 and is supplied to the control unit 14. By means of the activation unit 10', the control unit 14 selects one of the electronic switches T31, T32, T33, more precisely, the switch which is in series with the appropriate inductance for the capacitance value Clv of the load, as well as the magnitude of the delay $\Delta$t most suitable for the specific combination of capacitance and inductance and for the waveform to be produced in the capacitive load.

Naturally, it is also possible to provide for the possibility of excluding the activation of the resonant circuit by keeping all of the electronic switches permanently open. In this case, the system functions exactly like the known system. The selection of this type of operation may be appropriate for capacitive loads of very low value, that is, when the advantages of the resonant circuit would not be appreciable.

Although only a few embodiments of the invention have been described and illustrated, it is clear that many variants are possible within the scope of the same inventive concept. For example, as already mentioned at the beginning, it would be possible to control an inductive load rather than a capacitive load; in this case, it would be necessary to detect the voltage zero-crossing instead of the current zero-crossing. Moreover, a parallel resonant circuit could be used instead of a series resonant circuit. Furthermore, it would clearly be possible to produce any current waveform stored in the control unit 14, rather than a constant-current waveform.

Figure 12A:
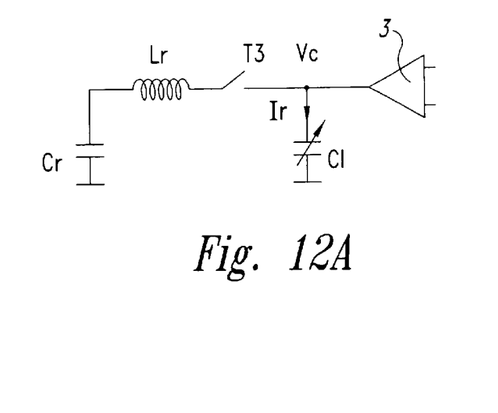
FIG. 12A is a simplified depiction of the circuit shown in FIG. 5.
Figure 12B:
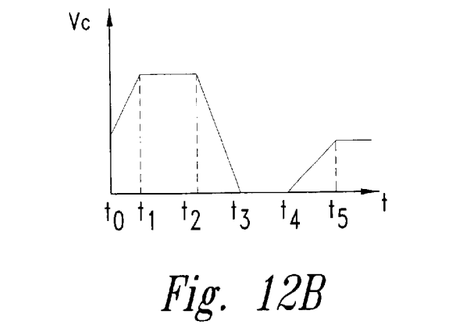
FIGS. 12B–12C are graphs of voltage and current, respectively, versus time during operation of the circuit of FIG. 12A.
Figure 12C:
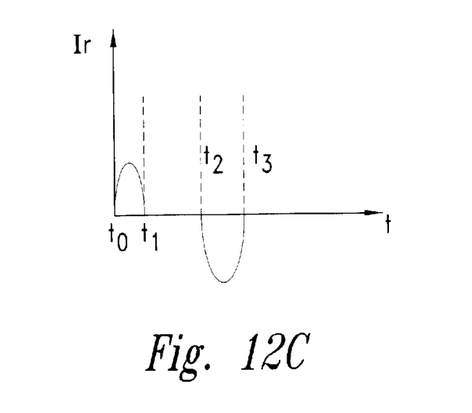

Shown in FIG. 12A is a simplified depiction of the circuit shown in FIG. 5. The circuit shown in FIG. 12A is a resonant circuit that includes the capacitive load Cr in parallel with a series connection of the switch $T_3$, inductance Lr, and capacitor Cr. Shown in FIG. 12B is a waveform depicting the voltage Vc across the capacitive load Cl from time to through time t5, similar to the voltage-versus-time waveform shown in FIG. 2 for the prior art circuit of FIG. 1. Shown in FIG. 12C is a waveform depicting the current Ir through the capacitive load Cl for the same time period t0–t5.

Figure 13A:
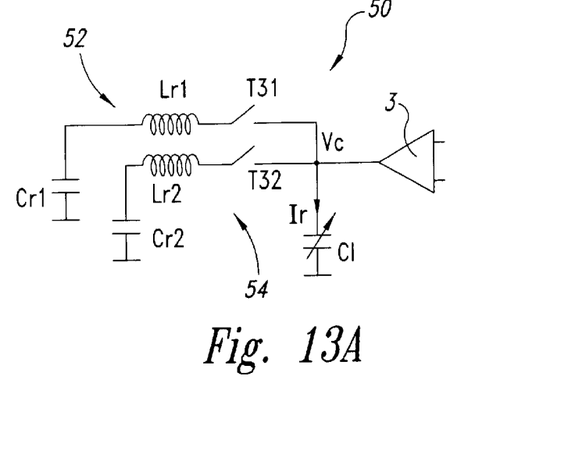
FIG. 13A is a simplified circuit diagram of an alternate embodiment of the invention.

A circuit 50 for driving a capacitive load Cl according to an alternative embodiment of the invention is shown in FIG. 13A. The circuit 50 includes a first resonance branch 52 that includes a first reference capacitor Cr1, a first inductor Lr1, and a first switch T31 coupled between ground and the capacitive load Cl. The circuit 50 also includes a second resonance branch 54 that includes a second reference capacitor Cr2, a second inductor Lr2, and a second switch T32 coupled between ground and the capacitive load Cl.

Figure 13B:
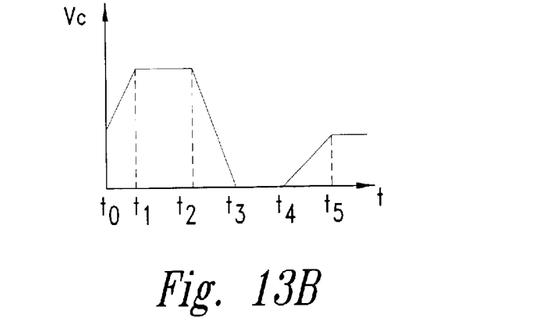
FIGS. 13B–13C are graphs of voltage and current, respectively, versus time during operation of the circuit of FIG. 13A.
Figure 13C:
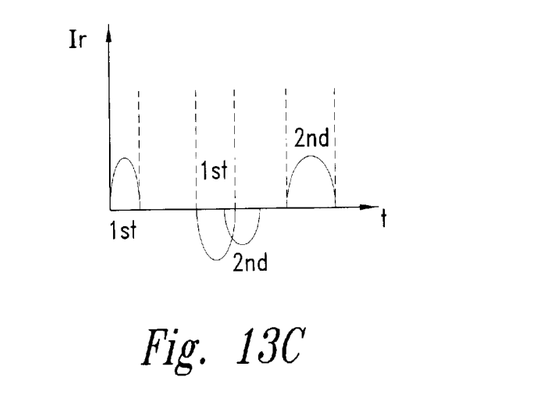

Shown in FIG. 13B is a waveform depicting the voltage Vc across the capacitive load Cl from time to through time t5 for the circuit 50 of FIG. 13A. Shown in FIG. 13C is a waveform depicting the current Ir through the capacitive load Cl for the same time period t0–t5. A comparison of FIG. 13C with FIG. 12C reveals that a positive current Ir through the capacitive load Cl is obtained for the period t0–t5 for the circuit 50 of FIG. 13A while no comparable positive current is shown in FIG. 12C. Employing two or more resonance branches 52, 54 as in FIG. 13A enables the charge stored in one resonance branch to be used to assist the error amplifier 3 in charging the capacitive load Cl during the period t4–t5 in which the error amplifier 3 applies the second raising ramp of the voltage Vc.

As discussed above and shown in FIG. 9D, the embodiment shown in FIG. 10 provides additional power savings compared to the embodiment of FIG. 5. The embodiment of FIG. 10 provides power savings by reducing the supply voltage of the operational amplifier 3 during the period of time in which the voltage in the capacitive load is low, for example, by changing from a level Vs to a level Vs/2, as shown in FIG. 9D. As can be seen in the voltage graph, the contribution of the voltage to the determination of the power in the period of the initial charging of Cl is further reduced in this case. This effect is achieved by means of a suitable supply with two switchable voltage levels.

Figure 14A:
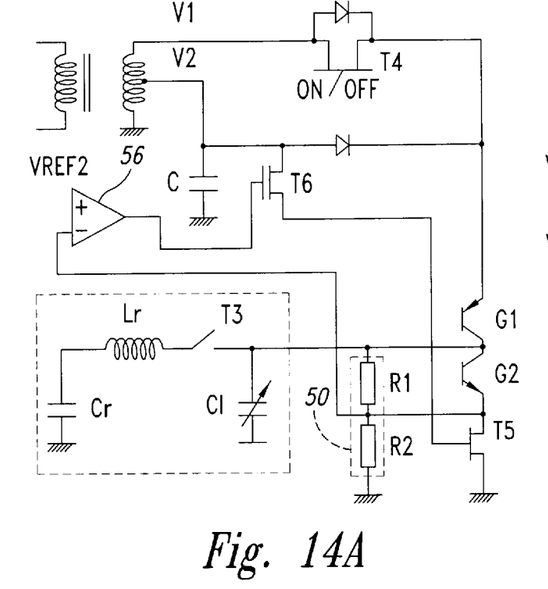
FIG. 14A is a diagram of a circuit according to a fourth embodiment of the invention.
Figure 14B:
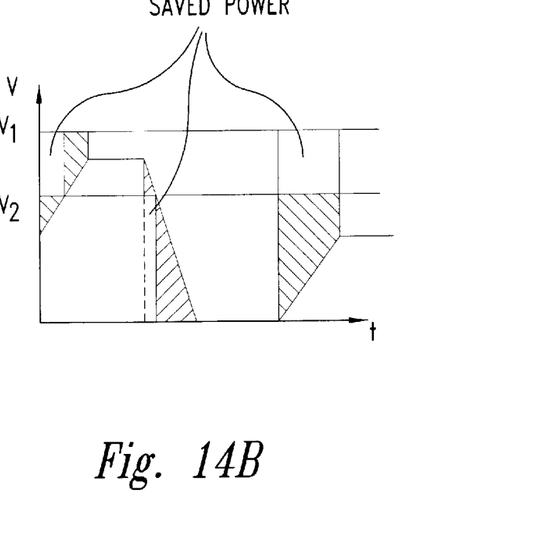
FIG. 14B is a graph of voltage versus time during operation of the circuit of FIG. 14A.

Further power savings can be achieved by the embodiment shown in FIG. 14A. The circuit of FIG. 14A is like that of FIG. 10 in that the generator/transistor G1 is supplied with a reduced voltage V2 during an initial charging period and with a higher voltage V1 after the transistor T4 is activated. Some of the details of FIG. 10 are not shown in FIG. 14A for simplicity, such as the switch activation circuit 10, control unit 14, input unit 15, DAC 16, and comparator 37, but these elements do form part of the circuit of FIG. 14A. In addition, the emitter of the generator/transistor G2 is coupled to ground through a transistor T5. The gate of the transistor T5 is connected through a transistor T6 to the reduced voltage V2. Thus, turning on the transistor T5, by turning on the transistor T6, connects the transistor G2 to the reduced voltage V2 while the transistor G2 is activated. As shown in FIG. 14B, this produces additional power savings during an initial portion of the downward voltage ramp.

The control of the transistor T6 is effected is effected by a comparator 56 having an output coupled to a control terminal of the transistor T6. The comparator 56 includes a non-inverting input coupled to a voltage reference VREF2 and an inverting input coupled to the sensor 12. When the voltage detected by the sensor 12 is equal to or greater than VREF2, the output of the comparator is at a high-level, which activates the transistor T6 and thereby connects the emitter of the transistor G2 to the reduced voltage V2. When the voltage detected by the sensor 12 drops below the voltage VREF2, the output of the comparator goes low, which turns off the transistor T6 and disconnects the transistor G2 from the reduced voltage V2.

Figure 15:
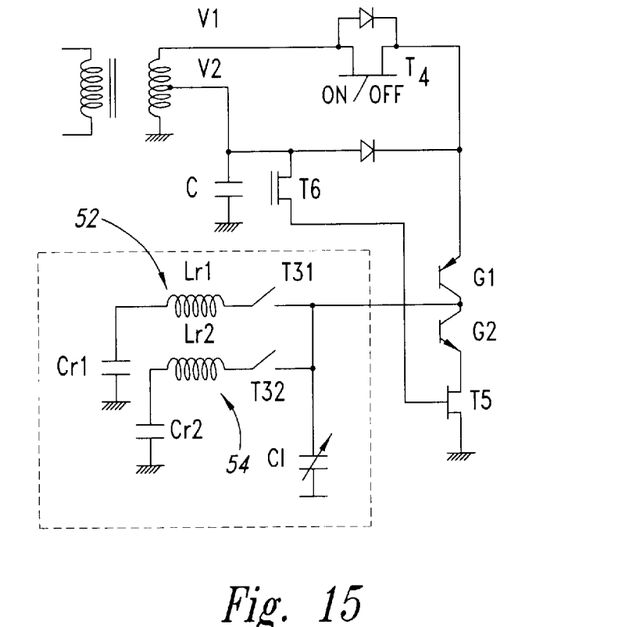
FIG. 15 is a diagram of a circuit according to a fifth embodiment of the invention.

FIG. 15 shows an embodiment in which all of the above-discussed power saving elements are incorporated into a single circuit. In particular, the circuit includes the two resonant branches 52, 54 for power savings during the rising voltage ramps, two voltage supplies V1, V2 coupled to the first generator/transistor G1 for additional power savings during the rising voltage ramps, and a connection through transistors T5, T6 of the two voltage supplies V1, V2 to the second generator/transistor G2 for power savings during the falling voltage ramps. In addition, further power savings can be obtained by delaying or advancing the closure of the switch T3 as discussed above with respect to FIGS. 5 and 9C.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A system for driving a reactive load, comprising:
   means for controlling a supply of the load, for supplying variable quantities of energy to the load in a controlled manner;
   a controllable first electronic switch;
   a first reactive component connected to the load by the first electronic switch, the first reactive component forming a resonant circuit with the load when the first electronic switch is closed;
   means for activating the first electronic switch; and
   a control unit connected to the controlled supply means and to the activation means in order to coordinate their operation in accordance with a predetermined program which defines the supply of energy to the load, wherein the controlled supply means include a multi-level voltage supply having first and second outputs that output respective first and second supply-voltage levels, an electrical quantity sensor coupled to the resonant circuit, and selector means, coupled to the voltage supply and the electrical quantity sensor, for selecting one of the supply-voltage levels in dependence on an electrical quantity in the resonant circuit that is sensed by the electrical quantity sensor.

2. The system according to claim 1, further comprising input means associated with the control unit for modifying the program which defines the supply of energy to the load.

3. The system according to claim 1 wherein the control unit generates a reference quantity corresponding to the energy to be supplied to the load, and wherein the controlled supply means comprise a sensor for detecting an electrical quantity of the load and error-compensation means for controlling the electrical quantity detected so as to keep it equal to the reference quantity.

4. The system according to claim 3 wherein the error-compensation means comprise a comparator which receives the electrical quantity detected and the reference quantity as inputs in order to compare them, and an output of which is connected to the load in order to supply energy or to absorb energy in dependence on the outcome of the comparison.

5. The system according to claim 4 wherein the comparator comprises an operational amplifier.

6. The system according to claim 1 wherein the means for activating the first electronic switch comprise a detector for detecting the zero-crossing of a sinusoidal electrical quantity in phase with an electrical quantity in the resonant circuit and means for opening the first electronic switch when the detector detects a zero-crossing of the sinusoidal electrical quantity.

7. The system according to claim 1 wherein the reactive load is a capacitive load and the resonant circuit formed by the capacitive load and by at least one reactive component comprises an inductance and a capacitance in series with one another.

8. The system according to claim 1, further comprising:
   a second controllable switch; and
   a second reactive component connected to the load by the second controllable switch, the second reactive component forming a resonant circuit with the load when the second controllable switch is closed;
   wherein the switch actuating circuit includes circuitry configured to actuate the second controllable switch.

9. The system according to claim 1 wherein the controlled supply means includes:
   first and second current sources coupled between the voltage supply and a voltage reference;
   a second electronic switch coupled between the second current source and the voltage reference and having a control terminal; and
   a third electronic switch coupled between the second output of the voltage supply and the control terminal of the second electronic switch, the third electronic switch being controlled for selective connection of the second current source to the second output of the voltage supply.

10. A system for driving a reactive load comprising:
    a load providing circuit for supplying variable and predetermined quantities of energy to the load;
    a first controllable switch having a control terminal;
    a first reactive component coupled to the load through the controllable switch, the first reactive component forming a resonant circuit with the load when the first controllable switch is closed;
    a switch actuating circuit coupled to the control terminal of the first controllable switch;
    a control circuit coupled to the load providing circuit and to the switch actuating circuit, the control circuit for coordinating the operation of the providing circuit and the switch actuating circuit in response to a predetermined program for supplying energy to the load;
    a second controllable switch having a control terminal; and
    a second reactive component connected to the load by the second controllable switch, the second reactive component forming a resonant circuit with the load when the second controllable switch is closed; wherein the switch actuating circuit includes circuitry configured to actuate the second controllable switch and the control circuit causes the switch actuating circuit to actuate a selected one of the controllable switches.

11. The system of claim 10 further comprising an input circuit coupled to the control circuit, the input circuit for changing the predetermined program.

12. The system of claim 11 wherein the control circuit generates a reference quantity corresponding to the energy to be supplied to the load.

13. The system of claim 12 wherein the control circuit comprises a sensor for detecting a quantity of the load, and an error-compensation circuit for controlling the quantity supplied to the load to be equal to the reference quantity.

14. The system of claim 13 wherein the error-compensation circuit includes a comparator coupled to the load in order to supply or absorb energy responsive to the sensor.

15. The system of claim 14 wherein the comparator comprises an operational amplifier.

16. The system of claim 11 wherein the switch activation circuit comprises a detector for detecting when a sinusoidal quantity in phase with an electrical quantity in the resonant circuit crosses zero, and comprising an actuator to control the switch responsive to an output of the detector.

17. The system of claim 11 wherein the load is capacitive and the at least one reactive component is an inductor and a capacitor coupled in series.

18. The system of claim 11 wherein the load providing circuit is capable of supplying more than one voltage levels responsive to an electrical quantity in the resonant circuit.

19. A system for driving a reactive load, comprising:
   a multi-level voltage supply having first and second outputs that output respective first and second supply-voltage levels;
   first and second current sources coupled between the voltage supply and a voltage reference, the first and second current sources being coupled to each other at a load node connected to the reactive load;
   a first switch having a control terminal;
   a first reactive component connected with the first switch between the load node and the voltage reference, the first reactive component forming a resonant circuit with the load when the first switch is closed;
   a switch activating circuit coupled to the control terminal of the first switch;
   a control unit connected to a control terminal of the first current source and to the switch activation circuit, the control unit being programmed to control the first current source and the switch activation circuit in accordance with a predetermined program which defines the supply of energy to the load;
   a first selector circuit coupled between the voltage supply and the first current source, the first selector circuit being structured to select one of the supply-voltage levels for delivery to the first current generator; and
   a second selector circuit coupled between the voltage supply and the second current source, the second selector circuit being structured to select one of the supply-voltage levels for delivery to the second current generator.

20. The system of claim 19, further comprising:
   a second controllable switch having a control terminal; and
   a second reactive component connected to the load by the second controllable switch, the second reactive component forming a resonant circuit with the load when the second controllable switch is closed; wherein the switch actuating circuit includes circuitry configured to actuate the second controllable switch and the control circuit causes the switch actuating circuit to actuate a selected one of the controllable switches.

21. The system of claim 19 wherein the second selector circuit includes:
   a second electronic switch coupled between the second current source and the voltage reference and having a control terminal; and
   a third electronic switch coupled between the second output of the voltage supply and the control terminal of the second electronic switch, the third electronic switch being controlled for selective connection of the second current source to the second output of the voltage supply.

22. The system of claim 21, further comprising:
   an electrical quantity sensor coupled to the resonant circuit and to the second selector circuit, the electrical quantity sensor being structured to sense an electrical quantity in the resonant circuit, wherein the second selector circuit includes a first comparator having a first input coupled to a first reference, a second input coupled to the electrical quantity sensor, and an output coupled to a control terminal of the third electronic switch.

23. The system of claim 22 wherein the second selector circuit includes:
   a second comparator having a first input coupled to a second reference, a second input coupled to the electrical quantity sensor, and an output; and
   a fourth electronic switch coupled between the voltage supply and the first current generator, the fourth electronic switch having a control terminal driven by the output of the second comparator.

24. The system of claim 19 wherein the switch activating circuit includes a detector for detecting the zero-crossing of a sinusoidal electrical quantity in phase with an electrical quantity in the resonant circuit and means for opening the first switch when the detector detects a zero-crossing of the sinusoidal electrical quantity.

25. The system of claim 19, further comprising a second reactive element connected in series with the first reactive element such that the resonant circuit includes the first and second reactive elements when the first switch is closed.

* * * * *